No. 772,184. PATENTED OCT. 11, 1904.
W. S. SPEED.
LIME OR CEMENT KILN.
APPLICATION FILED MAY 31, 1904.
NO MODEL.
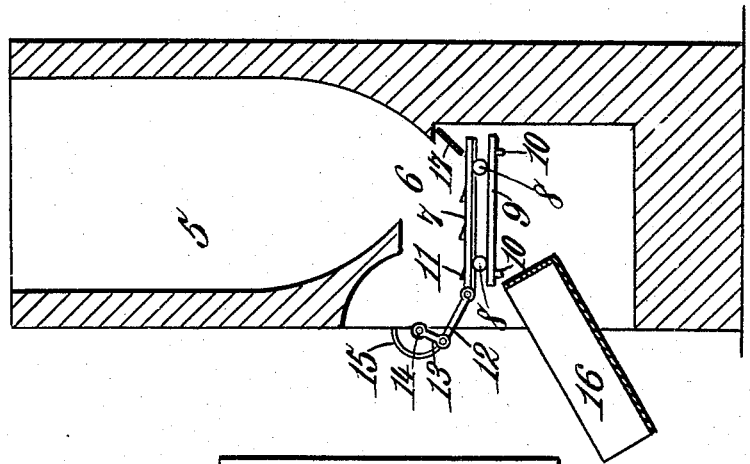
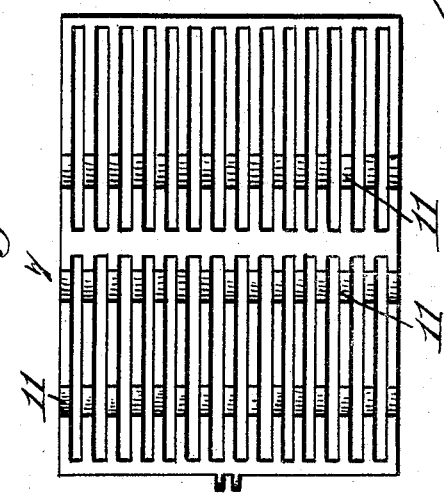
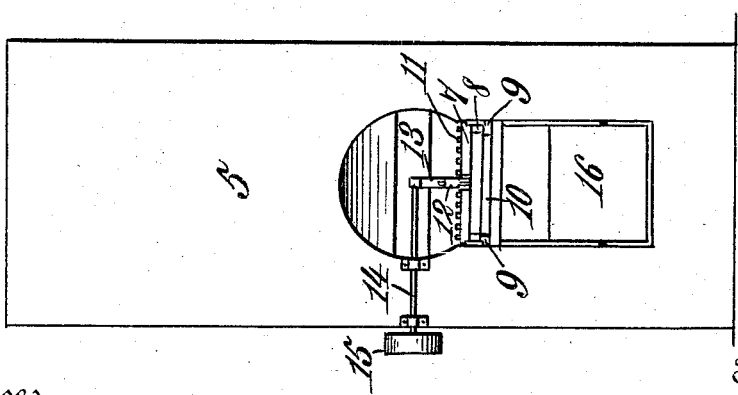
Witnesses
Inventor
William S. Speed.
By James L. Norris,
Attorney No. 772,184. Patented October 11, 1904.

UNITED STATES PATENT OFFICE.

WILLIAM S. SPEED, OF LOUISVILLE, KENTUCKY.

LIME OR CEMENT KILN.

SPECIFICATION forming part of Letters Patent No. 772,184, dated October 11, 1904.

Application filed May 31, 1904. Serial No. 210,538. (No model.)

*To all whom it may concern:*

Be it known that I, WILLIAM S. SPEED, a citizen of the United States, residing at Louisville, in the county of Jefferson and State of Kentucky, have invented new and useful Improvements in Lime or Cement Kilns, of which the following is a specification.

This invention relates to a lime or cement kiln, the object of the invention being to prepare a simple and effective feeder or positive discharging device therefor which is continuously movable, whereby certain advantages hereinafter particularly pointed out are secured.

In the drawings accompanying, forming a part of this specification, I have represented one simple and convenient adaptation of the invention, which I will fully set forth in the following description. I do not limit myself, however, to the precise disclosure thus made, for certain variations may be adopted within the scope of my claims.

Referring to said drawings, Figure 1 is a vertical central sectional elevation of a kiln involving my invention. Fig. 2 is a front elevation of the same, and Fig. 3 is a top plan view of a feed device.

Like characters refer to like parts throughout the several figures of the drawings.

In the drawings I have represented a kiln 5 of ordinary construction, having at the lower end of its main chamber an eye or discharge-opening 6. Under this eye or discharge-orifice at a suitable or convenient distance I arrange a force-feeder which is continuously operable and onto which the material from the main chamber of the kiln gravitates, whereby on the motion of the feeder such material may be delivered into a hopper, car, or other suitable receptacle.

The feeder illustrated is denoted by 7, and it is represented as consisting of a grid or grate like plate mounted for horizontal reciprocation. Upon the under side of the feeder 7 are carried wheels, as 8, adapted to travel upon parallel rails, as 9, constituting a suitable track or guide for the feeder on its advance and retractive movements. The rails 9 are sustained and in practice suitably united to cross-bars, as 10, set into the masonry of the kiln. However, other means than that shown may be provided for sustaining for traveling movement the feed device. Upon the upper side of said feed device are arranged longitudinally thereof a number of projections or lugs, as 11, which positively push the mass of material. To the forward side of the feed device 7, substantially centrally thereof, is pivotally connected the inner end of the link 12, the forward end of said link being likewise jointed to the outer end of a crank-arm, as 13, on the shaft 14, which may be mounted in any convenient manner in front of the auxiliary chamber in which the feed device works. The shaft 14 may be continuously driven in any desirable way. It is represented as provided with a pulley or band wheel, as 15, adapted to be connected by a belt or band (not illustrated) with a suitable motor.

The calcined material from the main chamber of the kiln gravitates onto the feed device 7, which, as is obvious, is continuously reciprocatory. Upon the forward movement of the feed device the same carries the lime or other material thereon forward, and during such motion the lime from the kiln falls upon the rear portion of the feed device. On the backward movement of the feed device a quantity of the material will fall off the front edge of the same and into the receptacle 16, which may be a hopper or car. The continuous operation of the feed device produces a constant and practically uniform removal of the calcined material and the consequent agitation and stirring up of practically the whole mass within the chamber of the kiln. It will therefore be apparent that I am enabled to increase the capacity of the kiln by virtue of the constant agitation of the material, by which uniform combustion is assured. As a consequence of the latter fact I save fuel. I also improve the quality of the material by the thorough and uniform calcination and prevent the calcined material from sticking or fusing to the fire-brick lining of the kiln by reason of the constant or uninterrupted agitation of the mass within the main chamber of the kiln. I am also enabled to dispense with labor in that I avoid the necessity of removing and again replacing bars usually employed for drawing the kiln.

I arrange in a plane below the eye or discharge-opening 6 and near the rear thereof an inclined plate, as 17, situated above the feed device 7. The lower edge of this plate is contiguous to the feed device. Said plate constitutes an effective guard to prevent the material from falling off the rear of the feed device or reciprocatory plate 7 down into the space below the latter or, as it is termed, the "pit."

Having described the invention, what I claim is—

1. The combination of a kiln having a discharge-orifice, a continuously-operable reciprocative force-feeder located below said orifice and adapted on its forward movement to carry the lime sustained thereon therewith, and to receive lime from the kiln through said orifice, and on its rearward movement to cause a quantity of the lime to fall over the front end of the same, and means for preventing the lime from falling off the rear end of said feeder.

2. The combination of a kiln having a discharge-orifice, a grid-like force-feeder located below and adapted to receive material from said orifice and having lime-advancing projections on its upper side, a continuously-operable shaft having a crank-arm, and a link connecting the crank-arm and force-feeder, whereby the latter will be continuously operated.

3. The combination of a kiln having a discharge-orifice, a continuously-operable reciprocatory force-feeder located below said orifice and adapted to receive the material gravitating therethrough, and an inclined plate above the feed device and located at the rear of the eye, serving to prevent material from falling off the rear of the feed device.

In testimony whereof I have hereunto set my hand in presence of two subscribing witnesses.

WILLIAM S. SPEED.

Witnesses:
 JAMES M. WINTERSMITH,
 CLARENCE YOUNG.